United States Patent Office 3,652,493
Patented Mar. 28, 1972

3,652,493
POLYESTERS STABILIZED WITH ORGANO
SUBSTITUTED SILANES
Mary J. Stewart, Media, Pa., assignor to
FMC Corporation, Philadelphia, Pa.
No Drawing. Filed Apr. 14, 1970, Ser. No. 28,530
Int. Cl. C08g 51/58
U.S. Cl. 260—45.7 R                                  5 Claims

ABSTRACT OF THE DISCLOSURE

A thermal stabilized polyester composition comprising a highly polymeric polyester containing a stabilizing amount of a compound selected from the group consisting of $HOSi(C_6H_5)_3$, $(C_6H_5)_2Si(OR)_2$, $(C_6H_5)_2(OH)_2$ and $(C_6H_5)_3SiH$ wherein R is a lower alkyl radical.

---

This invention relates to highly polymeric linear polyester resin filament and film compositions that possess improved thermal stability and to a method for producing same.

The saturated polyester resins used in the present invention to prepare the subject compositions can be either homopolymeric or copolymeric and can be prepared by any of the well-known methods which are thoroughly described throughout the prior art. For example, such saturated polyester resins can be prepared from aromatic dicarboxylic acids or esters thereof or suitable di-acid chlorides which do not contain any ethylenic unsaturation by reacting same with a suitable diol. For example, when an ester of a dicarboxylic acid is used as a starting material it is first reacted with a diol in the presence of a transesterification catalyst by means of an ester-interchange reaction; whereas, when a dicarboxylic acid is used as a starting material it is first subjected to a direct esterification reaction with a suitable diol in the presence of a first stage additive or ether inhibitor. In either instance the resulting reaction product, which may be described as a polyester prepolymer, is then polycondensed in the presence of a polycondensation catalyst to form a polyester resin.

In general, it is known that saturated polyesters which are suitable for filament and film-forming purposes should have a relatively high intrinsic viscosity preferably not less than about 0.60 (as determined in a 60% phenyl-40% tetrachloroethane solution, wt./wt. at 30° C.) a carboxyl content value of about below 50 equivalents per million grams (eq./10⁶ gr. or meq./kg.) and a diethylene glycol content less than about 1 wt. percent. Additionally, it is known that such polyester products generally degrade when exposed to heat for a substantial period of time. Such degradation is a problem in the extrusion or spinning processes of the finished resin to form the above denoted products. Furthermore, the fibers produced from such resins are extensively used in the textile field and as a result of this application are subjected to rather extreme temperatures in the processes of washing, drying, and ironing.

Therefore, it is an object of the present invention to prepare filament and film-forming saturated polyester resin compositions which exhibit improved thermal stability Another object of the present invention is to provide a method of preparing such thermal stabilized polyester compositions.

These and other objects are accomplished in accordance with the present invention with a stabilized polyester composition comprising a saturated polyester resin containing a stabilizing amount of the compound selected from the group consisting of those represented by the formulas $HOSi(C_6H_5)_3$, $(C_6H_5)_2Si(OR)_2$,

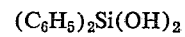

and $(C_6H_5)_3SiH$ wherein R is a lower alkyl radical containing from 1 to 6 carbon atoms.

Among the silane compounds which can be used as thermal stabilizers in the present compositions are, for example, triphenyl silane, diethoxydiphenyl silane, dimethoxydiphenyl silane, dibutoxydiphenyl silane, diphenyl silane diol and triphenyl silane.

The highly polymeric saturated polyester resins used in the preparation of the subject thermal stabilized polyester compositions can be any of the saturated polyester resins which are known and described in the prior art and as stated above can be either homopolymeric or copolymeric. For example, the subject polyester resins can be prepared from any of the well-known aliphatic diols which are generally used for such purposes. Among those which can be used are the glycols having the formula $HO(CH_2)_nOH$ wherein $n$ is a positive integer of from 2 to 6. Additionally, any of the cycloaliphatic glycols such as 1,4-cyclohexane dimethanol can be used. Among the alkylene glycols which can be used are, for example, ethylene glycol, 1,3-propylene glycol, 1,4-butylene glycol, and 1,6-hexylene glycol. The subject polyester resins can also be prepared from any of the gem-dialkyl glycols coming within the formula

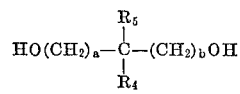

wherein $a$ and $b$ represent positive integers of from 1 to 3 and $R_4$ and $R_5$ represent lower alkyl radicals containing from 1 to 6 carbon atoms. Among those which can be used are 3,3-dipropyl-1,5-pentanediol, 2,2-dimethyl-1,3-propanediol, 2,2-diethyl-1,3-propanediol, 2,2-dimethyl-1,4-butanediol, 3,3-dimethyl-1,5-pentanediol, 2-ethyl-2-methyl-1,3-propanediol, and 2,2-dibutyl-1,3-propanediol. Obviously any combination of the above described diols can also be utilized to prepare the subject polyester resins.

The aromatic dicarboxylic acid derived segments of the subject polyester resins can be formed or prepared from any of the conventionally used saturated dicarboxylic acids or combination thereof described throughout the prior art. Among the dibasic acids which can be used are terephthalic acid, isophthalic acid, 4,4'-dibenzoic acid, p,p'-dicarboxydiphenyl propane, 4,4'-diphenylsulfone dicarboxylic acid, 2,6-naphthalene dicarboxylic acid and 5-sulfo isophthalic acid or any combination thereof. Obviously, as stated above, the polyester resins which can be stabilized in accordance with the present invention need not be made from the dicarboxylic acid but may be made through the use of an ester thereof or the diacid chloride thereof or any other corresponding reactive monomers.

In the practice of the present invention, it has been found that it is preferred to thoroughly mix or blend the present thermal stabilizers in the polyester resin immediately after the polycondensation step has been completed while the resin is still molten, preferably at atmospheric pressure, in order to obtain a uniform blend of resin and stabilizer. However, if indicated, the subject thermal stabilizers can be incorporated with the polyester resin at other suitable times such as mixing same with the solid resin before it is charged into an extruder or the like.

It has also been determined that the present thermal stabilizers, as defined above, are effective as such in polyester resin compositions when employed in amounts ranging from about 0.01% to about 0.5% by weight based on the weight of the saturated polyester resin to be stabilized. Usually, it has been found that a concentration ranging from about 0.02% to about 0.3% is preferred in most instances. However, when indicated, concentrations less or greater than the above can be used but the effectiveness is generally reduced proportionally.

The following examples will further serve to illustrate the present invention, although it will be understood that these examples are included merely for the purpose of illustration and are not intended to limit the scope of the present invention.

EXAMPLES 600 grams of dimethyl terephthalate, 396 mls. of ethylene glycol and 0.24 gram of lithium hydride were charged into a reaction vessel equipped with a nitrogen inlet, distilling arm and heating means. The reaction mixture was agitated and heated under atmospheric pressure to about 198° C. under nitrogen blanket whereby by-product methyl alcohol was distilled off. The reaction mixture was maintained at this temperature for about two hours. Then the temperature of the reaction mixture was allowed to rise to about 230° C. over a period of about one hour to distill off any remaining by-products and thereby form a polyester prepolymer consisting of bis(2-hydroxyethyl) terephthalate. The prepolymer was then allowed to cool under an atmosphere of nitrogen.

Six separate 50 gram samples of the above prepared prepolymer were then further reacted individually (poylcondensed) in the presence of 0.02 gram of antimony trioxide under sub-atmospheric pressure of about 0.1 mm. of mercury at 280° C. for two hours while under agitation to form high molecular weight polyester resins.

To five of the above batches of resins were added organo-substituted silane stabilizers of the present invention as listed in the following table with the exact weight used in each of the reaction mixtures. These stabilizers were incorporated in the individual polyester resin batches at the end of polycondensation reactions by thoroughly stirring the said stabilizers into the molten polyester resins at atmospheric pressure.

The following table sets forth the properties of the resin compositions which were produced by the above-described processes.

TABLE

| Example No. | Stabilizer | Quantity of thermal stabilizer added | Original intrinsic viscosity | DEG [1] | COOH [2] | Degraded intrinsic viscosity | Thermal stability [3] |
|---|---|---|---|---|---|---|---|
| 1 | Triphenyl silanol | 0.02 gm | .65 | .45 | 23 | .64 | .01 |
| 2 | Diethoxydiphenyl silane | 0.02 mls | .65 | .47 | 11 | .63 | .02 |
| 3 | Dimethoxydiphenyl silane | 0.02 mls | .66 | .43 | 21 | .61 | .04 |
| 4 | Diphenyl silane diol | 0.20 gm | .60 | .41 | 14 | .58 | .02 |
| 5 | Triphenyl silane | 0.12 gm | .65 | .37 | 30 | .63 | .02 |
| 6 | Control | | .76 | .37 | 15 | .66 | .08 |

[1] Wt. percent of combined diethylene glycol content.
[2] Carboxyl content expressed as equivalence per million grams.
[3] Expressed as percent broken bonds.

In the above examples, the original intrinsic viscosity values of the polyester resin products were obtained by measuring the intrinsic viscosities of the resin compositions as produced.

The degraded intrinsic viscosity values were determined by the following procedure: The polyester resin composition was ground and passed through a 10 U.S.S. mesh screen and dried at 120° C. in the vacuo for 16 hours, then cooled in a desiccator. Two to three grams of this dried resin was then placed in a test tube which was inserted into an aluminum block preheated to 280° C. ($\pm 0.5°$ C.). The block was sealed and evacuated to 0.1 mm. of mercury. After holding for about 10–15 seconds, the block was filled with dried, oxygen-free nitrogen gas. This vacuum-nitrogen purge was repeated for a total of three times; the entire process took 5–7 minutes. Then, the resin sample was left in the heated block for an additional two hours under a slow stream of nitrogen. After this two-hour period, the resin sample was removed from the block and placed in a desiccator which was first evacuated and then filled with nitrogen. The intrinsic viscosity of the resin product was then determined and such an intrinsic viscosity value is noted in the examples above as the degraded intrinsic viscosity.

The percentage broken bonds values or thermal stability values indicated in the above examples were calculated by the use of the following equation:

$$\text{Percent broken bonds} = \left[\left(\frac{K}{V_f}\right)^{1/a} - \left(\frac{K}{V_i}\right)^{1/a}\right] \times 9.6 \times 10^3$$

The value of $K$ and $a$ may be found in the literature, such as Conix, A., Makromol, Chemie 26, p. 226 (1958), wherein $K = 0.00021$ and $a = 0.82$. $V_f$ in the above formula is the degraded or final intrinsic viscosity value, and $V_i$ is the original or initial intrinsic viscosity value.

All of the intrinsic viscosity determinations of the polyester resin products produced in the above examples were determined in a 60% phenol–40% tetrachloroethane solution, wt./wt. at 30° C., according to conventional laboratory procedure.

The results in the above examples indicate that the present additives, when added to linear polyester resins, act to stabilize or reduce the degradation effects of higher temperatures upon such polyester resins. The change in intrinsic viscosity or the difference between the original intrinsic viscosity and the degraded intrinsic viscosty is a direct measure of the heat stabilizing effect that the present thermal stabilizers have upon polyester resins and can be readily calculated from the above results.

When the control above, Example 6, is compared with Examples 1 to 5 which are stabilized with thermal stabilizers of the present invention it can be readily seen from the intrinsic viscosity values and the percentage broken bonds values that the present stabilizers act to limit the amount of degradation that takes place when polyester resins are exposed to elevated temperatures for a prolonged period of time.

I claim:

1. A stabilized resinous polyester composition comprising a saturated polyester containing a stabilizing amount of a compound selected from the group consisting of those represented by the formulas $HOSi(C_6H_5)_3$, and $(C_6H_5)_3SiH$.

2. A composition of claim 1 wherein the polyester is polyethylene terephthalate.

3. A composition of claim 1 containing from about 0.01% to about 0.5% by weight of the thermal stabilizer based on the weight of the saturated polyester.

4. A composition of claim 1 wherein the compound is triphenyl silanol.

5. The composition of claim 1 wherein the compound is triphenyl silane.

References Cited

UNITED STATES PATENTS

| | | | |
|---|---|---|---|
| 3,335,211 | 8/1967 | Mead et al. | 260—75 |
| 3,475,371 | 10/1969 | Stewart et al. | 260—45.7 |
| 3,488,318 | 1/1970 | Stewart et al. | 260—45.7 |

FOREIGN PATENTS

| | | | |
|---|---|---|---|
| 6,898 | 1963 | Japan | 260—75 |

OTHER REFERENCES

Chemical Abstracts, vol. 45, citation 16002f.

DONALD E. CZAJA, Primary Examiner

V. P. HOKE, Assistant Examiner

PO-1050
(5/69)

UNITED STATES PATENT OFFICE
CERTIFICATE OF CORRECTION

Patent No. 3,652,493      Dated March 28, 1972

Inventor(s) Mary J. Stewart

It is certified that error appears in the above-identified patent and that said Letters Patent are hereby corrected as shown below:

Col. 1, line 21 "posses" should read --possess--. Col. 2, line 21, "triphenyl silane" (first occurrence) should read -- triphenyl silanol --; line 59, "poloyester" should read -- polyester --. Col. 3, line 59, "a" should be inserted after -- under --; line 69 "(poylcon-" should read -- (polycon- --. In the TABLE, Col. 3, numbers 4 and 5, "0.20 gm" and "0.12 gm" should read -- 0.02 gm -- and -- 0.02 gm --, respectively. In the TABLE, Col. 8, the numbers thereunder should read, -- .010; .028; .049; .022; .021; .080 --.

Signed and sealed this 8th day of August 1972.

(SEAL)
Attest:

EDWARD M. FLETCHER, JR.      ROBERT GOTTSCHALK
Attesting Officer      Commissioner of Patents